(No Model.) 2 Sheets—Sheet 1.
P. W. GATES.
MACHINE FOR BREAKING STONE AND CRUSHING ORE.
No. 250,656. Patented Dec. 13, 1881.
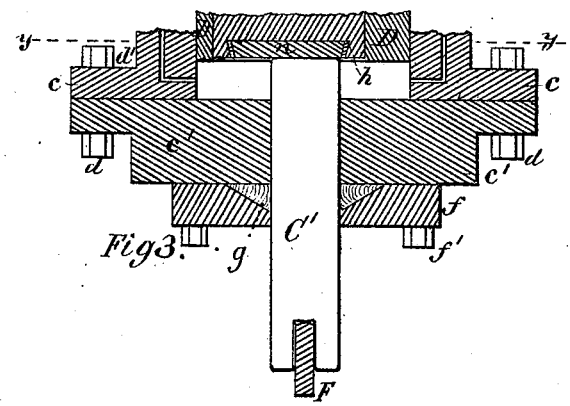
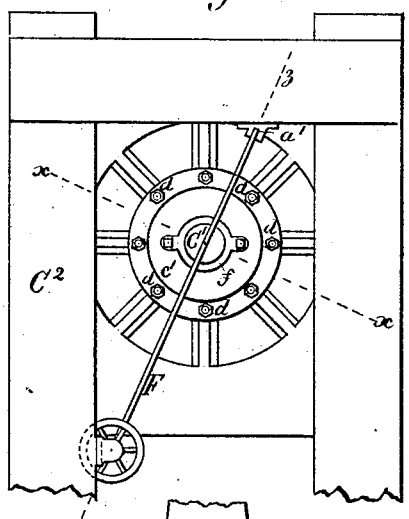
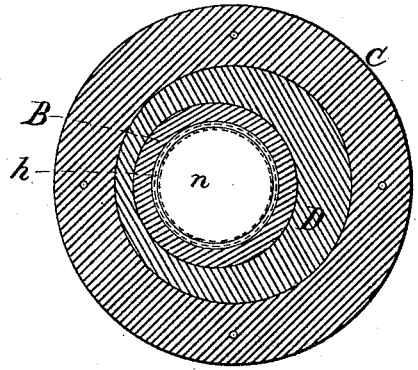
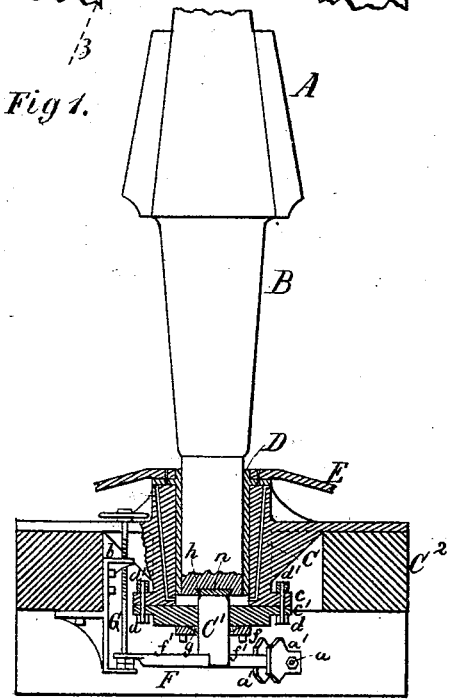
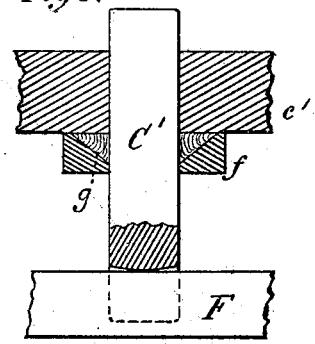
Witnesses:
J. P. Theo. Lang.
B Carlyle Fenwick.
Inventor:
Philetus W. Gates
by his att'ys
Mason, Fenwick & Lawrence (No Model.) 2 Sheets—Sheet 2.
P. W. GATES.
MACHINE FOR BREAKING STONE AND CRUSHING ORE.
No. 250,656. Patented Dec. 13, 1881.

Witnesses:
J. P. Theo. Lang.
B. Carlyle Fenwick.

Inventor:
Philetus W. Gates
by his attys
Mason, Fenwick & Lawrence

UNITED STATES PATENT OFFICE.

PHILETUS W. GATES, OF CHICAGO, ILLINOIS.

MACHINE FOR BREAKING STONE AND CRUSHING ORE.

SPECIFICATION forming part of Letters Patent No. 250,656, dated December 13, 1881.

Application filed October 8, 1881. (No model.)

*To all whom it may concern:*

Be it known that I, PHILETUS W. GATES, a citizen of the United States, residing at Chicago, in the county of Cook and State of Illinois, have invented certain new and useful Improvements in Machines for Breaking Stone and Crushing Ore, of which the following is a specification.

My invention relates to certain improvements in the crusher-shaft and oil step box of stone-breaking and ore-crushing machines, whereby beneficial results are secured, as will be hereinafter shown.

With my heretofore-patented stone-breaker great inconvenience is experienced whenever repairs are necessary, from the fact that the whole machine requires to be taken to pieces in order to get access to the parts below the bevel-wheel, which is attached to the revolving eccentric bearing-box of the crusher-shaft; also, from the fact that the machine requires to be taken to pieces in order to substitute a new crushing-shaft for one which has had only its lower end cut away, the cutting away being caused by the great downward pressure produced upon the shaft during heavy crushing operations; and a further inconvenience is experienced from the escape and waste of oil with other crushers, wherein the adjusting step-block is extended through the bottom of the step oil-box and made to rest upon a lifting-lever operated by a screw-shaft.

My improvements are designed to overcome all the above difficulties and at the same time render practicable the use of the lever and screw-shaft as a means for adjusting the step-block shaft and crusher-head, and thus save the attendant from the annoyance due to the dirty job of getting down under the machine and adjusting the step-block shaft and crusher-head with the center-screw, usually provided for that purpose.

Figure 7:
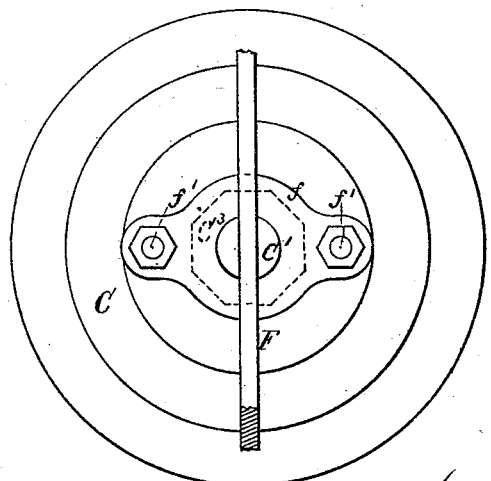
Figure 8:
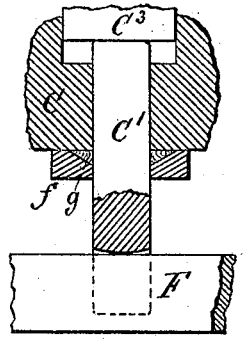
Figure 6:
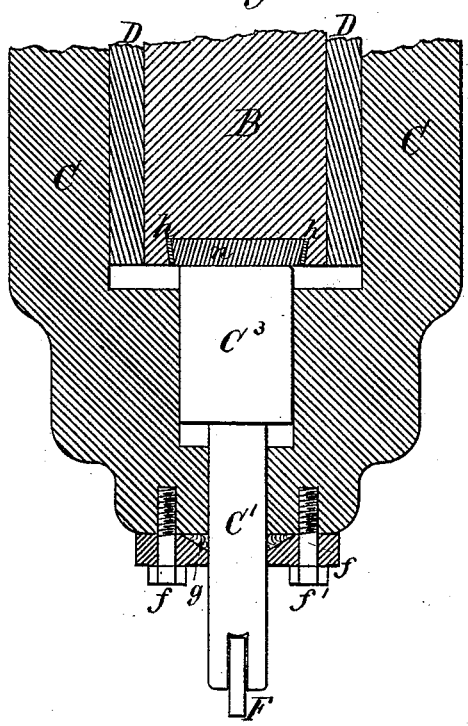

Figure 1 is a vertical section and partial elevation of a portion of a stone-crusher with my improvement applied to it. Fig. 2 is an inverted plan view of the same. Fig. 3 is a detail section in the line $x\, x$ of Fig. 2. Fig. 4 is a horizontal section in the line $y\, y$ of Fig. 3, looking downward. Fig. 5 is a detail section in the line $z\, z$ of Fig. 2. Fig. 6 is a vertical section and partial elevation of a stone-breaker having a part of my improvement applied to it. Fig. 7 is an inverted plan of Fig. 6, and Fig. 8 is a detail section taken on a line at right angles to the line of section of Fig. 6.

The crusher-head A, crusher-shaft B, step oil-box C, adjusting step-block C', frame C², eccentric bearing-box D, and bevel-wheel E for giving revolution to the bearing-box and shaft may be constructed in same manner as heretofore, except that the improvements which I have made in the shaft, oil-box, and adjusting step block require changes in construction of these parts, as follows:

The step oil-box C is made in two horizontally-divided parts, $c\, c'$, and these parts are provided respectively with a bolting-flange, and are bolted together by means of strong headed bolts $d$, passed through the flanges and secured by nuts $d'$, as shown. The part $c'$ forms a strong removable bottom for the step oil-box. Through the center of this bottom a passage is provided for the step-adjusting block C', which passes up into the step oil-box a proper distance for having the shaft B rest upon it. This block is made oil-tight at the hole where it passes through the bottom $c'$ by means of a plate, $f$, which is provided with a depression, $g$, into which wick or other packing material is placed, as shown. This plate is fastened in position by means of screws $f'$, so that it may be removed and its packing renewed, or for other purpose. The lower end of the step-block C' is bifurcated, in order to admit a lever, F, which is pivoted by one of its ends at $a$ to ears $a'$ of the frame C², and by its other end is connected to a vertical screw, G, which works in a nut, $b$, of the frame, and is provided with a hand-wheel on its upper end. By this arrangement of the step-block it will work oil-tight and prevent the escape and waste of oil from the step oil-box, and while this is so the crusher-shaft can be raised or lowered without the necessity of getting underneath the step oil-box, for by turning the wheel of the screw in one direction the lever will be raised and caused to force the step-block and shaft upward, and by turning it in a reverse direction the lever will be lowered and the other parts will descend by their gravity; and by making the step oil-box divisible horizontally at the point where its two parts $c\, c'$ are bolted together ready access to the interior of the step oil-box from a point below the flange of part c is afforded for the purpose of cleaning out this box, or for repairing the lower end of the shaft B, or for any purpose, and thus is avoided the necessity of removing the shaft and its connections through the top of the box, as well as the labor and time of taking the whole machine to pieces.

The bottom of the shaft B is bored out, so as to form a dovetail cavity or recess, h, and a hardened steel plate, or a plate of chilled iron, n, of less diameter than the recess, and having a beveled periphery, is placed in this recess, and a filling of zinc or a proper composition metal flowed into the recess around the plate, as shown in the drawings; or a plate of hard metal may be fitted to and driven tightly into a cylindrical cavity bored in the lower end of the shaft; or such plate may be secured in place in any proper manner. By this construction of the lower end of the shaft with a hard-metal plate a durable bearing for the step-block is provided and the great expense avoided of furnishing a new shaft for one which is simply impaired by being cut out at its lower end, my invention enabling the owner of the machine at small expense to repair an injured shaft; and in this connection the great utility of the step oil-box, made divisible at the point where its two parts are united, will be seen, for by removing the part c' of the box C access for repairing is at once afforded.

In Figs. 6, 7, and 8 an ordinary step oil-box with a step-block, C³, is shown, and in connection therewith the step-block C' (shown in the other figures of the drawings) is applied, to serve as an auxiliary step-block for lifting the block C³. The block C' is passed through the bottom of the step oil-box, and is made oil-tight by a removable plate, f, in which a depression, g, for the reception of packing is provided, as shown. The block C' in these figures of the drawings, as in all the others, is bifurcated at its lower end to admit the lifting-lever F, which is raised and lowered by the screw G, for the purpose of elevating or lowering block C³ and shaft B. The lower end of the shaft B in these figures is also shown provided with the bearing-plate n, same as in the other figures of the drawings, for the same purpose.

The step oil-box herein described is, as in my former patent, supplied with oil at its top, the usual loose hood or collar, having a valved passage through its side, being placed around the shaft B and made to rest upon the upper side of the crown-wheel E. The oil descends between the parts by means of the usual channels provided in the eccentric bearing-box, and circulates in the same manner as set forth in my former patent. The oil, however, may be supplied in any suitable manner, and may or may not be caused to circulate through channels in the wall of the step oil-box C. It is best to have it thus circulate, as a thorough lubrication is thereby accomplished.

What I claim as my invention, and desire to secure by Letters Patent, is—

1. The adjustable sliding step-block C', extending through the apertured oil step-box, and supporting-lever F, in combination with the apertured plate f, provided with a depression, the packing, and the oil step-box and shaft, substantially as and for the purpose described.

2. The combination of the crusher-shaft provided with a removable hard-metal plate, n, on its end, with the step-oil box C, made in two parts, c c', the vertical bolts, the step-block, and means for supporting the same, substantially as and for the purpose described.

3. The crusher-shaft provided with a cavity in its lower end, and with a hard-metal plate, n, secured in said cavity, in combination with the oil step-box, made in two parts, c c', the step block, and means for supporting said block, substantially as and for the purpose described.

4. The shaft of an ore-crushing machine, provided with a hard-metal plate on its lower end, in combination with the adjustable sliding step-block, an oil step-box, and a bearing for the shaft, substantially as and for the purpose described.

PHILETUS W. GATES.

Witnesses:
J. L. FARGO,
GEO. W. GATES.